Oct. 26, 1965 R. D. CHISHOLM 3,214,567

SAFETY INTERLOCK SYSTEM FOR HIGH TEMPERATURE OVEN

Filed Aug. 2, 1963 2 Sheets-Sheet 1

INVENTOR.
ROY D. CHISHOLM
BY Richard L. Caslin
HIS ATTORNEY

Oct. 26, 1965 R. D. CHISHOLM 3,214,567
SAFETY INTERLOCK SYSTEM FOR HIGH TEMPERATURE OVEN
Filed Aug. 2, 1963 2 Sheets-Sheet 2

INVENTOR.
ROY D. CHISHOLM
BY Richard L. Caslin
HIS ATTORNEY

3,214,567
SAFETY INTERLOCK SYSTEM FOR HIGH TEMPERATURE OVEN
Roy D. Chisholm, Louisville, Ky., assignor to General Electric Company, a corporation of New York
Filed Aug. 2, 1963, Ser. No. 299,660
9 Claims. (Cl. 219—413)

The present invention relates to an oven design and particularly to a door interlock system and control circuitry for the heating means of a high temperature domestic oven. This system and circuitry will insure that the temperature within the oven cavity will not rise above normal cooking temperatures unless the oven door is first closed and latched. Once the door is latched and the temperature rises above normal cooking temperatures, means are provided to prevent the oven door from being opened until the oven temperature has returned to the normal cooking temperature range.

This invention was developed for use with a high temperature oven that is useable in the home where the oven has provision for an automatic heat cleaning cycle and the temperature may be raised above the normal cooking temperatures of between 150° F. and 550° F. into a high temperature range between 750° F. and 950° F. so as to burn off all food soil from the oven walls and make it unnecessary to scrub these walls by hand. Heretofore, the major annoyance in using an oven has been the difficulty encountered in maintaining the walls of the oven liner clean. During normal cooking operations food particles and grease spatterings often drop onto the hot oven surfaces where they are partially burned and discolored as well as adhering tenaciously to the surfaces. Strong cleaning agents are available in the stores for application to the oven walls for the express purpose of removing food soil from them. Most of these cleaning agents are harmful to a person's skin and eyes and they likewise require a strong rubbing action before favorable results can be obtained. The copending application of Bohdan Hurko, Serial No. 244,493, filed December 13, 1962, now Patent No. 3,121,158, issued February 11, 1964, and assigned to the General Electric Company, the assignee of the present invention, teaches of the novel means and method of providing a self-cleaning baking oven.

In a high temperature oven where the maximum temperature might reach as high as 950° F., it is desirable to latch the oven door before the cleaning cycle is set in motion. Likewise, the door should not be opened during any part of the high temperature heat cleaning cycle. Once the high temperature cycle has been initiated, there is a short time interval or grace period of about five or ten minutes during which the user is allowed to change her mind and unlock the door before the temperature has increased to a critical degree. Once this grace period has passed, a lock means engages the door latching means to insure that the oven door may not be opened until the heat cleaning cycle has run its course.

A principal object of the present invention is to provide an oven with a mechanical interlock system cooperating with control circuitry to insure that the oven door is locked before the temperature within the oven cavity may rise above normal cooking temperatures, the interlock means serving to insure that the oven door may not be locked fully unless the manually settable oven temperature controls are preset to the high temperature positions.

A further object of the present invention is to provide the control circuitry for a domestic oven of the class described wherein a sequence timer means programs the heat cleaning cycle and provides a short grace period before the door latching means is locked for the duration of the heat cleaning cycle.

A further object of the present invention is to provide a high temperature oven of the class described with means to prevent the unlocking of the oven door until the temperature has returned to the normal cooking temperature range.

A still further object of the present invention is to provide a novel latching means for an oven door of the class described wherein the latching means is provided with a lost motion feature which comes into effect whenever the latching means is overstressed in order to prevent permanent deformation of the mechanism.

The present invention, in accordance with one form thereof, is embodied in an oven design having an oven cavity formed by an oven liner and an access door. A manual latching means is provided for holding the door in a closed position. A suitable heating means, either gas or electric, is provided to raise the temperature of the oven cavity to a normal cooking temperature range between about 150° F. and 550° F., as well as to raise the temperature into a high temperature range for heat cleaning between about 750° F. and 950° F. The control circuitry includes a thermostatic control system having a temperature senser and a manually adjustable thermostatic device, where the said device serves to monitor the source of energy for the heating means and thereby control the temperature within the oven cavity.

A mechanical interlock means is operatively connected between the door latching means and the thermostatic device. An indexing means is included with either or both the oven selector switch device and the thermostatic device to receive the interlock means when the said device is set at the high temperature heat cleaning position whereby the failure of the interlock means to move into the indexing means serves to prevent the door latching means from closing fully. A latch switch means is operatively associated with the door latching means in the closed position of the latching means for energizing the control circuit and setting up the heating means for the high temperature operation. A lock member is provided for engaging the door latching means in the closed position and thereby preventing the latching means from being opened during the high temperature cycle. A sequence timer means is also included and it has a start camming means which is operated by the latching means in the closed position thereof, the timer means also includes a lock camming means which serves to hold the lock member from engagement with the door latching means for a short grace period after the latching means is first closed. A switch camming means is also provided on the timer means for engagement with a timer switch means for energizing the timer means as well as the control circuit for the heating means. Finally, there is a lock switch means that is operatively connected with the lock member and is closed when the lock member engages the door latching means as the final step in energizing the high temperature cleaning cycle.

My invention will be better understood from the following description taken in conjunction with the accompanying drawings and its scope will be pointed out in the appending claims.

Figure 1:
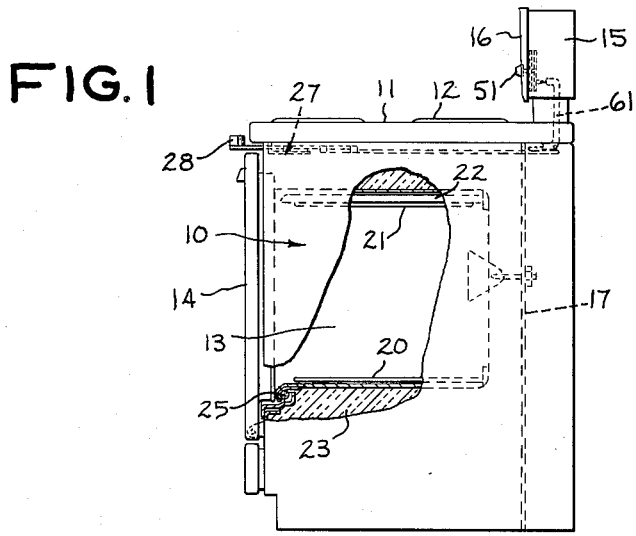
FIGURE 1 is a right side elevational view of a freestanding range having the interlock mechanism and control circuitry of the present invention with parts broken away to show the oven cavity.

Turning now to a consideration of the drawings and in particular to FIGURE 1 there is shown for illustrative purposes a free-standing electric range 10 having a range body or cabinet with a top cooking surface 11 with a plurality of surface heating elements 12, an oven cavity 13, a front-opening oven door 14, and a backsplash 15 arranged along the back edge of the cooking surface 11 and containing a control panel 16 in the front face thereof which includes the various manually settable control components which govern the energization of the various heating elements of the range.

The oven cavity 13 is formed by a metallic oven liner 17 of box-like construction and the front-opening drop door 14 mentioned previously. As in standard electric ovens there is a lower heating element or Bake unit 20 and an upper heating element or Broil unit 21. Combined with the Broil unit is a metal reflector 22 that overlies the broil unit and causes the heat energy developed by the Broil unit to be directed down with a searchlight pattern toward the food placed under it. Both the Bake and Broil units 20 and 21 are provided with electrical terminals adjacent the back wall of the oven liner and connected to an electrical connector block or lead wires (not shown) as is conventional in this art. The oven liner 17 is insulated from the range body by having a relatively thick blank of insulation 23 of Fiberglas or the like material in order to prevent the waste of heat energy from the oven cavity as well as to maintain the temperature of the outer walls of the range at a temperature which will not permit kitchen cabinet structures to become heated above a maximum of 194° F. which is a requirement of the Underwriters' Laboratory Inc.

It is imperative to provide generally uniform wall temperatures within the oven cavity in order to insure complete cleaning of the food soil so that no hand work need be done in order to obtain complete cleanliness. Because of the oven door 14, heat energy will escape through and around the door so that it has been found expedient to add an auxiliary or mullion heater 25 which is wrapped around the outside of the throat of the open front of the oven liner as is best seen in FIGURE 1 to replenish the heat loss in this vicinity and thereby obtain relatively uniform temperatures throughout the oven cavity.

The latch mechanism of the present invention is indicated by the numeral 27 and it is located adjacent the front of the oven cabinet or range body above the door opening and beneath the cooktop 11. This invention is not directed toward a specific door latching mechanism but instead is concerned with a mechanical interlock and control system which is combined with an oven door latching mechanism to insure that the high temperature heat cleaning cycle cannot be initiated until the oven door is closed and latched, as well as to insure that the door may not be unlatched and opened at any time that the oven temperature is within the heat cleaning temperature range. If more information is desired about the door latching mechanism, reference may be had to a copending application of Ray C. Eigelbach, application Serial No. 135,876 which was filed on September 5, 1961 (now Patent No. 3,125,365) and is assigned to the General Electric Company the assignee of the present invention. A version of the Eigelbach design may also be consulted in a copending application of Clarence Getman, application Serial No. 277,174 which was filed on May 1, 1963, (now Patent No. 3,189,375) and has the same assignee. Both of these door latch mechanisms were developed for use with a high temperature baking oven of the class described.

Figure 2:
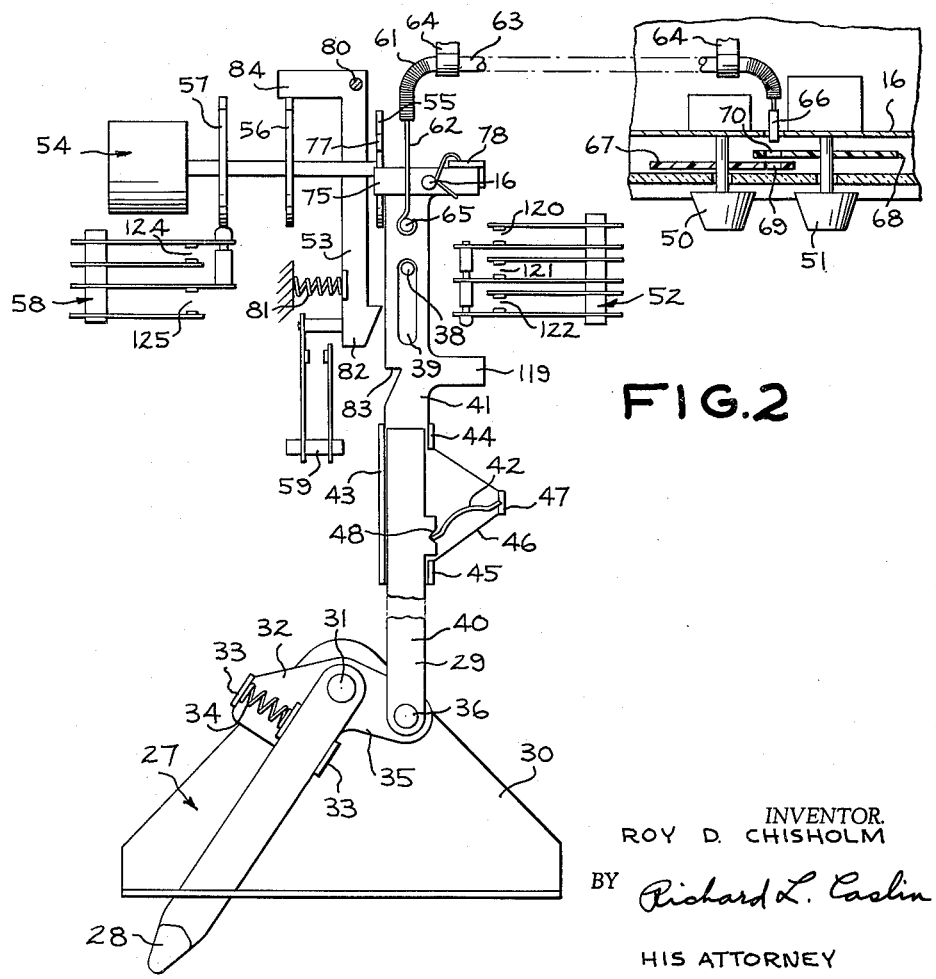
FIGURE 2 is a schematic diagram in plan view of the door latching mechanism and showing a mechanical interlock means cooperating with the manually settable control devices for obtaining the proper heating sources and temperature levels, as well as showing the interaction between a sequence timer and the various control switches utilized in the circuitry.

Turning now to the schematic drawing of FIGURE 2, the latching mechanism 27 is shown as including a pivoted handle 28 and an actuator rod 29 both in combination with a mounting plate 30 which is adapted to be fastened within the range body. FIGURE 2 does not include a showing of the oven door 14 nor the hook members of the latching mechanism for engaging the door and pulling it closed tightly against its door gasket for sealing the door gap from the escape of smoke, odors and vapors but it should be understood that such elements would be provided. The handle member 28 is supported from a fixed pivot pin 31 and it is shown in its left hand or open position.

Also associated with the pivoted pin 31 is a carriage 32 that is mounted on the same pin 31 beneath the handle 28 as a lost motion connection between the handle 28 and actuator rod assembly 29. This carriage has the general shape of a bell crank lever where one portion is provided with a vertical pair of parallel stop members 33 (which rise above the carriage for loosely receiving the handle 28 therebetween. A compression spring 34 is seated against the left hand stop member 33 and bears against one side of the handle 28 for holding the handle normally against the right hand stop member 33 as is illustrated in FIGURE 2. The opposite end of the carriage 32 has an offset link portion 35 with a pivot pin 36 adjacent the outermost end thereof for making a pivotal connection with the actuator rod assembly 29. In order to promote reciprocal movement of the actuator rod as the handle pivots toward the right through an acute angle of about 60° to a locked position, the actuator rod assembly 29 is guided by means of a pin and slot connection 38 and 39 adjacent the back end of the actuator rod. As shown in the drawing, the pin 38 is a pin that is fixed with respect to the mounting plate 30, and the slot 39 is an elongated slot formed in the actuator rod assembly 29.

For reasons which will be better understood hereinafter the actuator rod assembly 29 is formed in two tandem parts; namely, the arm 40 and the link member 41 which are prevented from becoming vertically separated by suitable guiding means or tabs (not shown). This arm 40 and link 41 are connected together in such a way that they normally move in unison with a reciprocating motion as the handle 28 pivots between its open and closed positions, or said in another manner, between its unlocked and locked positions. A column spring member 42 is braced between the arm 40 and link 41 so that they normally represent a single rigid member. The link 41 is provided with a vertical guiding flange 43 and a vertical pair of spaced tabs 44 and 45 which lie in a single plane that is parallel to the guiding flange 43 for confining the arm 40 therebetween and limiting the movement of the arm 40 with respect to the link 41 along the length thereof.

Moreover, the link 41 includes a side extension 46 with an outermost tab member 47 that has a notch which serves as a seat for one end of the column spring 42. The other end of the column spring is seated in a V-shaped notch of a tab 48 in the adjacent side of the arm 40. If for some reason the link member 41 is prevented from moving when the handle 28 is moved from its open position of FIGURE 2 to its closed position, then the rearward movement of the arm 40 will overcome the biasing force of the column spring 42 so that the tab 48 of the arm 40 will shift until it engages the tab 44. By this time the handle 28 will have reached its final closed position. Similarly, the handle 28 may be returned to its open position. This is accomplished by having the column spring 42 move back overcenter until it returns to the position shown in FIGURE 2.

An advantage of the two piece actuator rod assembly is to enable the oven door to be latched during normal cooking operations such as during Baking without initiating the Heat Cleaning cycle or locking the door closed for a prolonged period of time. Under these conditions, either the thermostat or the switch dial or both will be turned out of its proper Heat Cleaning position thereby preventing the plunger 66 from moving into the indexing holes 69 and 70 which will be explained hereinafter. Since the link 41 cannot move under this circumstance, the column spring 42 is forced overcenter and the latch mechanism hooks the door without disturbing the link member 41.

The main control components, in addition to the door latching means 27, are an oven selector switch 50, a manually settable temperature control device or thermostat 51, a door latch switch 52 comprising a stack of three normally open switches which are closed when the door latching mechanism is fully closed, and a lock member 53 which is capable of locking the door latching mechanism in the closed position so that the door latch may not be opened during the heat cleaning cycle. There is also a sequence timer 54 which is supplied with a group of three cam members or plates; namely, (1) a start cam 55 which is acted upon by the door latching mechanism in the closed position to mechanically turn the shaft of the timer motor, (2) a lock cam 56 which is in effect a time delay device which holds the lock member 53 away from the latching means for a short time interval to provide a grace period which allows the user to unlock the door before the oven temperature has become excessive, and (3) a switch cam 57. This switch cam cooperates with a timer switch 58 that comprises a stack of two normally open switches which will be better understood hereinafter. Lastly, there is a lock switch 59 that is held open by the lock member 53 and is closed only when this lock member is in engagement with the latching means. The closing of this lock switch 59 is the final step in initiating the heat cleaning cycle.

It has been considered expedient to provide an interlock means between the latching means and either one or both of the oven selector switch 50 and the temperature control device or thermostat 51 to insure that the proper temperature is set before the sequence timer 54 commences the heat cleaning cycle which is preset at manufacture to run anywhere from one to three hours. Without such an interlock means it might be possible to inadvertently lock the door and set the time in motion and it would then require the running of the full cycle before the oven door could be unlocked and the oven used for preparing the next meal, much in the manner of a time operated vault for storing valuables in a bank. Such an interlock means is illustrated as a flexible push-pull actuator or choke cable 61 which comprises a solid wire core 62 and a flexible metallic sheath 63. The sheath is rigidly fastened in place as at the spaced points 64 so that both tension and compression forces exerted on the wire 62 will cause the wire to move through the sheath. One end of the wire is attached to the innermost end of the actuator rod assembly 29 by being wound around a pin 65. The opposite end of the wire 62 is provided with a plunger 66 that is guided in its movement in the control panel 16 of the backsplasher, it being understood that both the oven selector switch 50 and the thermostat 51 are mounted on the control panel and located within the backsplasher.

Both the oven selector switch 50 and the thermostat 51 are provided with indicator dials such as 67 and 68 respectively which are visible in part through small windows (not shown) in the control panel. Each dial is supported on the shaft of the device for which it is designed. The indicator dial 67 for the oven selector switch 50 would include indicia such as Off, Bake, Time Bake, Broil, and Clean. The indicia on the indicator dial 68 of the thermostat 51 would have various cooking temperatures ranging from 150° to 550°, then a Broil position and finally a Clean position. Both indicator dials 67 and 68 are arranged to overlie each other along one side thereof, and each is provided with an indexing hole 69 and 70 respectively. These holes are aligned with each other as shown in FIGURE 2, when both the selector switch 50 and the thermostat 51 are set to the Clean position. Accordingly, when the handle 28 of the door latching means is moved from the open to the closed position, the wire 62 of the choke cable 61 will be forced to move the plunger 66 through the indexing holes 69 and 70 of the indicator dials 67 and 68 of the switch and thermostat 50 and 51.

In the event the switch and thermostat are not set properly to the Heat Clean position, the indicator dials will constitute obstructions for the plunger 66 and hence the link 41 of the actuator assembly will be restrained from movement. Thus, the column spring 42 will be forced to swing overcenter allowing the arm 40 to move relative to the link 41 so that the handle 28 may move to its closed position. It should be understood that the latching mechanism is not fully closed because the handle 28 may be opened and the latch switch 52 has not been closed as is necessary in order to initiate the Heat Cleaning cycle.

Figure 3:
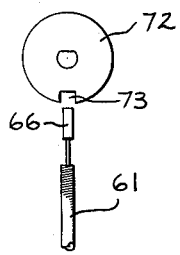
FIGURE 3 is a fragmentary view of a second modification of indexing means for one of the control devices to cooperate with the mechanical interlock means that is connected to the door latching means.

FIGURE 3 shows a modification of the interlock means of FIGURE 2 in that the indexing hole 69 or 70 has been replaced by a collar 72 which would be mounted on one of the switch or thermostat shafts. The collar would contain a notch 73 that would serve as the indexing means to cooperate with the plunger 66 of the choke cable 61. This modification would result in a much more rigid system than the use of the indicator dials 67 and 68 of FIGURE 2. Another alternative would be to use a double choke cable, each to engage a notch in a collar or separate holes in two smaller dials. Also, a single cable could be joined to a rocker arm having two fingers, where each finger cooperates with a notched collar.

The back end of the actuator rod assembly 29 is provided with a spring biased pawl 75 which is pivotally supported thereon about a pivot pin 76 for cooperation with the start cam 55. A finger or dog 77 extends from the periphery of the cam 55 for engagement of the tip of the pawl 75 as is shown in FIGURE 2. The pawl 75 is capable of pivoting in a clockwise direction but not in a counterclockwise direction because of a stop member 78 that rises vertically from the back end of the link member 41. Thus, the pawl 75 serves as a pusher member against the dog 77 when the door handle is being closed. The pawl 75 serves to turn the shaft of the timer 54 which in turn closes switch contacts of the timer switch 58 that energize the timer and cause the start cam to make a complete revolution thereby bringing the dog 77 against the opposite side of the pawl 75. Then when the handle member is returned to the open position of FIGURE 2, the pawl is allowed to pivot clockwise out of the way of the dog 77 until the pawl assumes the position shown in FIGURE 2, which is the starting position.

Figure 4:
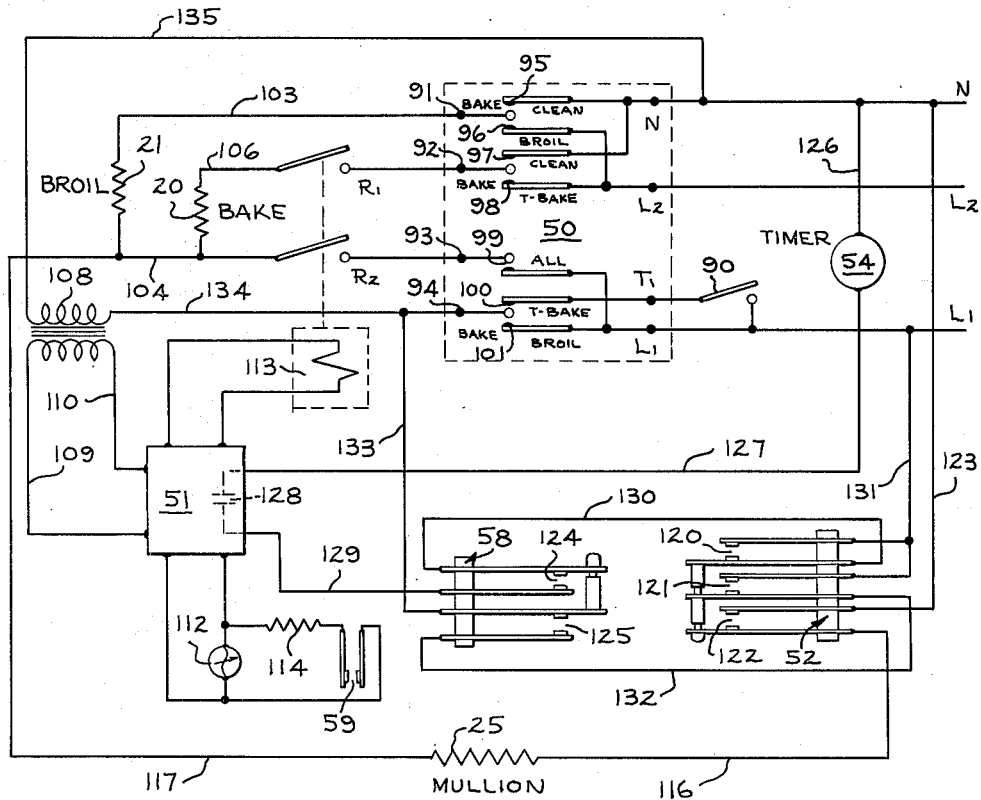
FIGURE 4 is a partial diagram of the heating and control circuits for a high temperature electric oven of the present invention.

There is one other mechanism illustrated in FIGURE 2 which should be understood before turning to a detailed description of the heating and control circuit of FIGURE 4. It is important to be able to lock the door latching means 27 once the Heat Cleaning cycle has commenced to insure that the oven door may not be opened when the oven temperature is above a normal cooking temperature in the vicinity between 750° F. and 950° F. Thus, provision has been made for a pivoted lock member 53 which is pivoted about a pivot point 80 and is provided with a spring biasing force 81 which bears against the distal end 82 of the lock member to cause the lock member to turn in a counterclockwise direction. This distal end is provided with a hook that is adapted to engage within a keeper portion 83 of the link member 41 of the actuator rod assembly 29 when the latching means is fully closed. The lock cam 56 of the timer 54 controls the movement of the lock member 53 by means of acting upon an offset leg member 84 of the lock member 53. Thus, the lock member is in the shape of a bell crank lever having an elongated leg terminating in the hook portion 82 and a short leg 84 for cooperation with the lock cam 56. This lock cam provides a time delay action for the movement of the lock member 53 of about five minutes after the latching means is fully closed. Once the five minute grace period has passed the lock cam 56 releases the lock member and the spring biasing force 81 goes into action to press the hook end 82 of the lock member 53 into the keeper 83 of the actuator rod assembly 29. Once the lock member 53 engages the actuator rod assembly 29 it is not possible to unlock the door until the timer 54 has completed its timing cycle of perhaps three hours. If an attempt is made to swing the latch handle 28 from its locked right hand position to its unlocked left hand position, the spring 34 will merely be compressed by the handle movement and the carriage 32 will remain stationary.

The oven control network illustrated in FIGURE 4 in-includes a three-wire Edison source of power supply of 236 volts, single phase, 60 cycle A.C. or in some exceptional areas of 208 volts, three phase, provided with a pair of line wires L1 and L2 and a grounded neutral conductor N. The network also includes the manually operable oven selector switch 50, a manually settable temperature control device or thermostat 51, the electric heating elements that are illustrated in FIGURE 1; namely, the Bake unit 20, the Broil unit 21, and the mullion heater 25. Other elements in the circuit include the sequence timer 54, the latch switch 52, the timer switch 58 and lock switch 59. The remaining elements will be discussed in detail after the preliminary explanation of the circuit network.

The oven selector switch 50 is interposed between the source of power and the heating elements. The selector switch 50 has line terminals N, L1 and L2 as well as an additional terminal T1 for use with a conventional oven timer for use during the cooking operations. This conventional timer is illustrated simply as switch 90, and it is not to be confused with the sequence timer 54 which times only the heat cleaning cycle. The oven selector switch 50 also has a series of load terminals 91–94. Moreover, the oven switch includes seven sets of switch contacts 95–101. These contact switches are labeled with the operation which takes place when the particular switch contacts are closed. For example, during a Broiling operation only the broil unit 21 is energized and it operates a 236 volts across lines L1 and L2. This is accomplished by an internal connection in the oven switch 50 between starting at line terminal L2 through switch contacts 96, to load terminal 91, by lead 103 to broil unit 21, by lead 104 through relay contacts R2 to load terminal 93, through switch contacts 99 to line terminal L1.

During the Baking operation oven switch contacts 95, 98, 99 and 101 are closed. During the Time Baking operation contacts 98, 99 and 100 are closed. Lastly, for the Heat Cleaning cycle contacts 95, 97 and 99 are closed.

Going back to the Baking operation, both the Bake and Broil units 20 and 21 are energized. The first unit, the Bake unit, is operated at 236 volts across lines L1 and L2 while the Broil unit operates at a lower voltage of 118 volts across line L1 and neutral N. To trace the circuits during the Baking operation, the Bake unit 20 is energized from line L2 through switch contacts 98, load terminal 92, through normally open relay contacts R1 and lead 106, through Bake unit 20, through lead 104, relay contact R2 to load terminal 93, switch contacts 99 to line terminal L1. Also, there is a circuit from neutral terminal N through switch contacts 95, to load terminal 91, from lead 103 to Broil unit 21, lead 104 through relay contact R2 to load terminal 93, through switch contacts 99 to line terminal L1.

During a Time Baking operation, a clock mechanism (not shown) may be adjusted to start and stop the baking operation automatically. This timer is shown diagrammatically as switch contacts 90 connected from the line L1 to the line terminal T1 of the oven switch 50 thereby shunting the line terminal L1. During the Time Baking operation only the Bake unit 20 is energized and it is at the higher voltage of 236 volts across lines L1 and L2. The circuit may be traced from line terminal L2 through the switch contacts 98 to load terminal 92, through relay contacts R1, through lead 106, Bake unit 20, lead 104, relay contacts 92, to load terminal 93 and switch contacts 99 to line terminal L1.

The control circiut embodying the thermostat 51 has a potential of about 12 volts supplied from the secondary of a step-down transformer 108. Upon the closure of oven switch contacts 100 or 101 during normal cooking operations, an alternating voltage of 118 volts is applied across the primary winding of the transformer by leads 134 and 135 across L1 and N so that a reduced-magnitude voltage appears across the secondary winding of the transformer and hence across leads 109 and 110. During the Heat Cleaning cycle the control circiut is energized not through the oven selector switch 50, but through contacts 125 of the timer switch 58 and contacts 121 of the latch switch 52 by means of leads 135, 134, 133, 132 and 131.

The temperature control device or thermostat 51 is of the basic type as disclosed in the Baker Patent No. 2,962,575. This thermostat has a pulsing thermal relay (not shown) that is controlled by a variable-resistance senser 112 that in turn controls a responder relay (not shown) which finally controls an output relay 113 that has the double pole single throw relay contacts R1 and R2 that were mentioned previously as being located within the power circuit to control the flow of power to the heating elements of the oven. The senser 112 is preferably a resistor having a high temperature coefficient of resistance, and it is located within the oven cavity to detect the oven air temperature therein. This senser may be constructed of fine wire such as platinum or nickel having a high positive temperature coefficient of resistance, or as an alternative a ceramic thermistor element may be used having a high negative temperature coefficient of resistance. It is to be understood however that the use of a negative coefficient material reverses the action of the thermostat. For purposes of the description of the present invention the senser 112 has a high positive temperature coefficient of resistance.

This type of electric thermostat has been perfected by Baker and others so that it is accurate for a range of cooking temperatures between about 150° and 550° F. It would result in a very expensive design to extend the principles of the Baker design while retaining accuracy of operation to a wider range of temperature that would include the heat cleaning temperatures of between 750° and 950° F. Thus, provision has been made for shifting the control point of the electric thermostat so that there is in effect two accurate temperature ranges, one range covering the normal cooking temperatures and the second range covering the heat cleaning tempertures. The preferred manner in which this shift in the control point of the circuit can be effected is by reducing the effective voltage of the senser by placing a shunt resistor 114 across the senser. This is done by use of the lock switch 59 which was mentioned previously as being operated by the lock member 53. This switch 59 is closed when the lock member is allowed to move by the lock cam 56 and said member engages the latching means after a grace period of about five minutes.

Going back to the power circuit, mention will now be made of the circuit for the Heat Cleaning operation. During this high temperature cycle all three heating elements, Bake unit 20, Broil unit 21 and mullion heater 25 are connected in parallel at a voltage of 118 volts across line L1 and neutral wire N. The circiut for the Broil unit is from neutral terminal N through switch contacts 95, load terminal 91, lead 103, Broil unit 21, line 104, relay contacts R2, load terminal 93, switch contacts 99 to line terminal L1. As for the Bake unit 20, the circuit is from neutral terminal N through switch contacts 97, load terminal 92, relay contacts R1, lead 106, Bake unit 20, lead 104, relay contacts R2, load terminal 93, switch contacts 99 to line terminal L1. The circuit for the mullion heater 25 is from neutral wire N by lead 123 through one of the switch contacts such as contacts 122 of the latch switch 52 and then by lead 116 to mullion heater 25 and then by lead 117 and lead 104 through relay contact R2, load terminal 93, switch contacts 99 to line terminal L1.

The latch switch 52 is a triple pole, normally-open stack switch which is adapted to be closed by a finger 119 that extends from the side of the link member 41 of the actuator rod assembly 29. These three sets of switch contacts are identified as 120–122 and they are closed simultaneously whenever the latching mechanism is fully closed. Contacts 122 relate to the mullion heater 25 and are connected by lead 116 to the mullion heater 25 and to the neutral wire N by means of lead 123. The other two switch contacts 120 and 121 are in series with the two switch contacts 124 and 125 respectively of the timer switch 58 as is best seen in FIGURE 4. Contacts 120 and 124 relate to the timer 54 while the contacts 121 and 125 relate to the transformer 108 of the control circuit.

This timer switch 58 is operated when the shaft of the sequence timer 54 is indexed by the action of the pawl 75 on the back end of the link 41 of the actuator rod assembly 29 of the latching mechanism against the dog 77 of the start cam 55 as the door latch is fully closed. The motor of the timer 54 is connected by leads 126 to neutral wire N and by lead 127 to switch contacts 128 in the responder of the thermostat 51 and then in series connection with the switch contacts 124 by lead 129 as well as in series with switch contact 120 by means of lead 130 and finally to line L1 by means of lead 131. It should be understood that the switch contact 128 in the responder would only be added to the circuit if the interlocking choke cable 63 cooperated with the oven switch 50 and not the thermostat 51. Then the switch contacts 128 would be necessary to prevent the operation of the heat cleaning cycle unless the thermostat is set at the Clean position. The Clean setting of the thermostat would close the switch contacts 128 and set up the circuit for the cleaning cycle. If the circumstances were reversed and the choke cable cooperated with the hole 70 of the thermostat 51 and not the oven switch, then a pair of normally closed switch contacts (not shown) would be added to the door latch switch 52 and be connected in line L2 before the oven switch.

Considering now the general mode of operation of the Heat Cleaning cycle, the oven selector switch 50 and the temperature controller or thermostat 51 must be set to Heat Cleaning position and the handle 28 of the latching mechanism must be moved to its closed position. In so doing, the latch switch 52 is closed, the plunger 66 of the choke cable enters the indexing holes 69 and 70 of the indicator dials 67 and 68 of the switch and thermostat, and the start cam 55 is indexed by the pawl 75 on the end of the actuator rod assembly of the latching mechanism. As the timer shaft is indexed, the switch cam 57 will close the contacts 124 and 125 of the timer switch 158. Thus, the timer will begin to time out its preset cycle, as for example 180 minutes. It should be noted that the lock switch 59 remains open so that the shunt resistor 114 is not placed in circuit with the senser 112 at the outset therefore the temperature cannot rise above the normal cooking temperatures of a maximum of about 550° F. There is a short grace period of about five minutes during which time it is possible to unlatch and open the door thereby stopping the Heat Cleaning cycle.

In the event the door handle 28 remains closed beyond the grace period of approximately five minutes the lock cam will then disengage itself from the lock member 53 thereby allowing the spring 81 to bias the hook end 82 of the lock member into engagement with the link 41 of the actuator rod. When this takes place the lock switch 59 will be closed thereby connecting the resistor 114 across the senser 112 and initiating the Heat Cleaning cycle from a point of no return, meaning that the complete cycle of 180 minutes must be completed before it will be possible to open the door handle 28. One series pair of switch contacts of the latch switch 52 and the timer switch 58; namely, contacts 120 and 124 in unison with the responder contact 128 are closed for operating the timer motor 54. The other series pair of contacts 121 and 125 cause power to be supplied to the transformer 108 thereby energizing the thermostat 51 and causing power to be supplied to the oven heating units by way of the relay contact R1 and R2 as long as the power is needed to reach and maintain a predetermined temperature. After about 150 minutes or whatever cleaning time is settled upon the switch cam 57 allows the transformer contacts 125 to open because there is a greater spacing between contacts 125 than is present between contacts 124. These contacts 125 being open cut off the power to the transformer and thus to the heating unit by way of the thermostat 51 and its output relay 113 and its relay contacts R1 and R2. This allows the oven to start cooling down. During this cooling period, the timer 54 continues to run and at about 179 minutes the lock cam 56 engages the lock member 53 and moves it away from the latching means thereby allowing the door to be opened. At about a minute later the switch cam 57 allows the other contact 124 of the timer switch 58 to open thus de-energizing the sequence timer so that the oven may be opened and used in the conventional manner with an appearance of a new oven completely free of food soil. The door handle 28 need not be opened immediately as the electrical control system is completely de-energized. The opening of the handle 28 opens the latch switch 52 as well as resets the pawl 75 for later cooperation with the dog 77 of the start cam 55. Also the plunger 66 of the choke cable 61 is withdrawn from the indexing holes of the switch and thermostat which, of course, is necessary for obtaining normal cooking operation. The series connection between two of the contact switches of the timer switch and the latch switch provide the desired grace period while allowing the timer to control the end of a normal heat cleaning cycle. An alternative would be to move the mullion heater contact 122 so that it is in combination with the contacts of the lock switch 59.

Modifications of this invention will occur to those skilled in this art, therefore, it is to be understood that this invention is not limited to the particular items disclosed but that it is intended to cover all modifications which are within the true spirit and scope of this invention as claimed.

What I claim as new and desire to secure by Letters Patent of the United States is:

1. An electric oven comprising an oven cavity formed by an oven liner and an access door, electric heating elements in heat transfer relation to the oven cavity, a power circuit with a source of voltage for connection to the heating elements, a manual selector means for arranging the heating elements in various power circuit combinations, a thermostatic control means combined in a low voltage control circuit and compriisng a temperature senser positioned within the oven cavity and a manually settable temperature control means cooperating with the senser, the temperature control means having contact means located in the power circuit for governing the energization of the heating element, latching means for sealing the oven door in a closed position, a sequence timer means positioned so as to be operated by the door latching means in the closed position, a lock member for engaging the latching means in the closed position and preventing the latching means from being opened, the timer means including a first camming means for deactivating the lock member just prior to the stopping action of the timer means and for activating the lock member a short time interval after the timer means has started by the closing of the door latching means, the timer means including a second camming means that cooperates with a timer switch means for energizing the control circuit and hence the power circuit, and lock switch means operated by the lock member when engaging the latching means for shifting the scale of the thermostatic control means into a high temperature range, an interlock means cooperating between the latching means and at least one of the manual selector means and the manually adjustable temperature control means, said interlock means insuring that the latching means may not be closed unless the proper high temperature setting has been adjusted on the manual control means.

2. A baking oven having an oven cavity formed by an oven liner and an access door, heating means provided for the oven cavity, a source of energy for the heating means, manual selector means for governing the amount of energy converted by the heating means, an electrical control circuit comprising a low voltage source of current, a temperature senser and a manually adjustable thermostatic means, the temperature senser being located within the oven cavity and having two temperature ranges, one temperature range being a normal cooking range between about 150° F. and 550° F., the second temperature range extending from 750° F. to about 950° F., said thermostatic means monitoring the said source of energy and thereby controlling the temperature within the oven cavity, a manual latching means for holding the oven door in a closed position, and interlock means cooperating between the latching means and at least one of the manual selector means and the manually adjustable thermostatic means to prevent the latching means being closed unless the high temperature settings are properly selected on the manual means that cooperates with the interlock means, sequence timer means having a start camming means that is positioned to be operated by the door latching means in the closed position, a lock member for engaging the latching means in the closed position and preventing the latching means from being opened during the high temperature cycle, the timer means including a lock camming means for delaying the movement of the lock member into engagement with the latching means for a short grace period, the timer means also including a switch camming means that also incorporates with a timer switch means having contacts which energized the timer means and the low voltage control circuit, and lock switch means operated by the lock member when it engages the latching means for shifting the operating range of the temperature senser into the high temperature range, and latch switch means in series conection with the timer switch means and operated by the latching means when it is closed for insuring that the high temperature cycle cannot be initiated until the door is latched.

3. An electric oven comprising an oven liner and a door that forms an oven cooking cavity, heating means for said cavity including a source of energy and an upper electrical broil heating unit, a lower electrical bake heating unit, and a third heating unit coextensive with at least part of the oven liner adjacent the door, the bake and broil units being used for normal cooking operations in a temperature range between about 150° F. and 550° F., the third heating unit and at least one of the bake and broil units being energized in unison to raise the temperature into a high temperature range between 750° F. and 950° F., an automatic heat cleaning operation to remove the food soil from the inner walls of the oven cavity; the invention comprising safety means for insuring that the heating cycle cannot be initiated unless the door is locked to prevent the door from being opened while the oven temperature is within the high temperature range, a manual latching means for holding the door in a closed position, an oven thermostatic control system comprising a control circuit that includes a temperature senser and a manually adjustable thermostatic device, the thermostatic device serving to monitor the source of energy for the heating means and thereby control the temperature within the oven cavity, a mechanical interlock means connecting between the latching means and the thermostatic device, and index means included with the thermostatic device to receive the interlock means thereby allowing the movement thereof only when the device is set at the high temperature range, the failure of the interlock means to move serving to prevent the latching means from closing fully, and latch switch means operated by the latching means in the closed position thereof to energize the control circuit and the heating element for the high temperature range, a lock member for engaging the latching means in the closed position and preventing the latching means from being opened during the high temperature cycle, a time delay means for withholding the lock member from engagement with the lacthing means for a short grace period after the latching means is first closed, and a lock switch means connected in the control circuit and operated by the lock member when the member engages the latching means to shift the temperature scale for the thermostatic control system into a high temperature range.

4. A domestic cooking oven comprising a box-like oven liner and an access door that defines an oven cavity, a source of electric power supply, and a heating circuit adapted to be completed to said power supply to furnish heat to said oven cavity, and a manual latching means for holding the door in a closed position; the combination comprising a selector switch having an Off position and an On position, said selector switch in its Off position interrupting said heating circuit, said selector switch in its On position preparing said heating circuit, a control circuit having a manually settable temperature control device with a variable Bake position and a Heat Cleaning position, said temperature control device in its variable Bake position correspondingly presetting a variable Bake temperature for said oven cavity in the normal cooking temperature range extending from 150° F. to about 550° F., said temperature control device in its Heat Clean position presetting a given Heat-Clean temperature for said oven cavity in the Heat-Cleaning temperature range extending from about 750° F. to about 950° F., a mechanical interlock means operatively associated with the latching means, and index means included with the temperature control device to receive the interlock means only when the device is set at the high temperature range, the failure of the interlock means to enter the index means preventing the latching means from closing fully, and latch switch means operated by the latching means when it is closed for insuring that the high temperature Heat-Clean cycle cannot be initiated until the oven door is latched shut, a lock member for engaging the latching means in the closed position and preventing the latching means from being opened during the Heat-Cleaning cycle, a timer means for programming the various operations of the Heat-Cleaning cycle, the timer means having a start camming means that is positioned to be operated by the door latching means in the closed position, the timer means including a lock camming means for delaying the movement of the said lock member into engagement with the latching means for a short grace period, a timer switch means having contacts for energizing the timer means and the said control circuit, the timer means including a switch camming means that cooperates with the timer switch means and controls the operation thereof, and lock switch means operated by the lock member when said member engages the latching means in the final step of initiating the Heat-Clean cycle.

5. A domestic cooking oven comprising a box-like oven liner and an access door defining an oven cavity, a source of electric power supply, and a heating circuit adapted to be completed to said power source to supply heat into said oven cavity, and a manual latching means for holding the door in a closed position; the combination comprising a selector switch having an Off position and an On position, said selector switch in its Off position interrupting said heating circuit, said selector switch in its On position preparing said heating circuit, a control circuit having a manually settable temperature control device with a variable Bake position and a Heat-Clean position, said temperature control device in its variable Bake position correspondingly presetting a variable Bake temperature for said oven cavity in the normal cooking temperature range extending from about 150° F. to about 550° F., said temperature control device in its Heat-Clean position presetting a given Heat-Cleaning temperature for the said oven cavity in the Heat-Cleaning temperature range extending from about 750° F. to about 950° F., and latch switch means operated by the door latching means when it is closed for insuring that the high temperature Heat-Cleaning cycle cannot be initiated until the oven door is latched shut, a lock member for engaging the latching means in the closed position and preventing the latching means from being opened during the Heat-Cleaning cycle, a timer means for programming the various operations of the Heat-Cleaning cycle, the timer means having a start camming means that is positioned to be operated by the door latching means in the closed position, the timer means including a lock camming means for delaying the movement of the said lock member into engagement with the latching means for a short grace period, a timer switch means having contacts for energizing the timer means and the said control circuit, the timer means including a switch camming means that cooperates with the timer switch means and controls the operation thereof, and lock switch means operated by the lock member when said member engages the latching means as the final step in initiating the Heat-Cleaning Cycle, the switch camming means serving to de-energize the heating circuit after a predetermined length of time, the lock camming means serving to withdraw the lock member from the latching means a predetermined time after the heating circuit has been de-energized so that the oven door may not be opened until the oven cavity temperature has cooled down to within the normal cooking temperature range.

6. A domestic cooking oven as recited in claim 5 wherein the latching means comprises a pivoted handle member and an actuator rod assembly pivotally connected to the handle, the handle being capable of swinging through an angle between an open and a closed position, the actuator rod being capable of reciprocable movement, a mechanical interlock means connected to the actuator rod, and index means included with the temperature control device to receive the interlock means only when the said device is set at the Heat-Cleaning range, the failure of the interlock means to enter the index means preventing the latching means from closing fully.

7. A domestic cooking oven as recited in claim 6 wherein the actuator assembly is formed in two parts so as to be capable of lost motion with respect to each other, and spring means connected between the two parts of the actuator rod for holding the two parts substantially rigid with respect to each other during normal operations of the handle, and excessive force exerted on the handle tending to stress the spring means over-center thereby allowing relative movement between the two parts of the actuator rod, the said latch switch means being operated by the latching means only when the said spring means prevents relative movement between the two parts of the actuator rod.

8. A domestic cooking oven comprising a box-like oven liner and an access door that defines an oven cavity, a source of electric power supply, and a heating circuit adapted to be completed to said power supply to furnish heat to said oven cavity, and a manually operated latching means for holding the door in a closed position; the combination comprising an oven selector switch having an Off position and an On position, said selector switch in its Off position interrupting said heating circuit, said selector switch in its On position preparing said heating circuit, a control circuit having a manually settable temperature control device with a variable Bake position and a Heat Cleaning position, said temperature control device in its variable Bake position correspondingly presetting a variable Bake temperature for said oven cavity in the normal cooking temperature range extending from 150° F. to about 550° F., said temperature control device in its Heat Cleaning position presetting a given heat-clean temperature for said oven cavity in the heat cleaning temperature range extending from about 750° F. to about 950° F., a mechanical interlock means operatively associated with the latching means, an index means included with the temperature control device to receive the interlock means only when the temperature control device is set at the high temperature range, and normally closed switch contact means in series with the oven selector switch, said switch contact means being opened upon the the latching of the oven door to prevent the energization of the heating circuit when the oven selector switch is set for normal baking operations.

9. A domestic cooking oven comprising a box-like oven liner and an access door that defines an oven cavity, a source of electric power supply, and a heating circuit adapted to be completed to said power supply to furnish heat to said oven cavity, and a manual latching means for holding the door in a closed position; the combination comprising a selector switch having an Off position and an On position, said selector switch in its Off position interrupting said heating circuit, said selector switch in its On position preparing said heating circuit, a control circuit having a manually settable temperature control device with a variable Bake position and a Heat Cleaning position, said temperature control device in its variable Bake position correspondingly presetting a variable Bake temperature for said oven cavity in the normal cooking temperature range extending from 150° F. to about 550° F., said temperature control device in its Heat Cleaning position presetting a given heat-clean temperature for said oven cavity in the Heat Cleaning temperature range extending from about 750° F. to about 950° F., a mechanical interlock means operatively associated with the latching means, and index means included with the oven selector switch to receive the interlock means when the said switch is set at the high temperature range, the failure of the interlock means to enter the index means preventing the latching means from closing fully, and latch switch means operated by the latching means when it is closed for insuring that the high temperature heat-clean cycle cannot be initiated until the oven door is latched shut, a lock member for engaging the latching means in the closed position and preventing the latching means from being opened during the Heat-Cleaning cycle, a timer means for programming the various operations of the Heat-Cleaning cycle, the timer means having a start camming means that is positioned to be operated by the door latching means in the closed position, the timer means including a lock camming means for delaying the movement of the said lock member into engagement with the latching means for a short grace period, a timer switch means having contacts for energizing the timer means and the said control circuit, and normally open switch contact means combined in the temperature control device to be in a series with the timer switch means and prevent the completion of the Heat-Cleaning circuit unless the temperature control device has been first set to the high temperature range, the timer means including a switch camming means that cooperates with the timer switch means and controls the operation thereof, and lock switch means operated by the lock member when said member engages the latching means in the final step of initiating the Heat-Clean cycle.

No references cited.

RICHARD M. WOOD, *Primary Examiner.*